United States Patent [19]

Sidebottom

[11] 4,413,672

[45] Nov. 8, 1983

[54] CENTRAL DESK AIR CONDITIONING CONTROL SYSTEM

[75] Inventor: Donald L. Sidebottom, Louisville, Ky.

[73] Assignee: General Electric Company, Louisville, Ky.

[21] Appl. No.: 365,764

[22] Filed: Apr. 5, 1982

[51] Int. Cl.³ .......................... F24F 3/00; G05D 23/00
[52] U.S. Cl. .......................................... 165/22; 236/51; 340/825.06
[58] Field of Search ....................... 236/47, 51; 165/22; 340/825.06

[56] References Cited

U.S. PATENT DOCUMENTS

| | | | |
|---|---|---|---|
| 3,871,443 | 3/1975 | Jones | 165/11 |
| 3,979,060 | 9/1976 | Tierce | 165/12 X |
| 4,060,123 | 11/1977 | Hoffman et al. | 236/51 |
| 4,077,566 | 3/1978 | Bradford | 236/51 |
| 4,132,355 | 1/1979 | Cleary et al. | 236/51 |
| 4,143,813 | 3/1979 | Bryans | 236/51 |
| 4,174,064 | 11/1979 | Pratt, Jr. | 236/51 |
| 4,206,443 | 6/1980 | Britton | 340/825.06 |
| 4,284,126 | 8/1981 | Dawson | 236/51 |
| 4,287,939 | 9/1981 | Pohl et al. | 236/51 |

Primary Examiner—William E. Wayner
Attorney, Agent, or Firm—Frank P. Giacalone; Radford M. Reams

[57] ABSTRACT

A central desk air conditioning control system wherein each individual room unit is connected to a central desk location by a pair of control conductors. At the central desk location a SPST switch is connected across each pair of control conductors and effective, when closed, to place the connected individual room unit in a low energy mode. In the low energy mode, power relay drivers for major energy-consuming loads such as refrigerant compressors and electrical resistance heaters are disabled, while other loads, such as fans and control circuitry, remain energized. For the event that voltages are inadvertently connected to the control conductors, a protective network is included in each individual room unit to prevent damage to its circuitry. The control circuitry for each individual room unit includes "Freeze Sentinel" circuitry for energizing a heating load when required to ensure that room temperature does not fall below 40° F. regardless of user control settings. In the low energy mode the Freeze Sentinel circuitry continues to operate manually.

12 Claims, 1 Drawing Figure

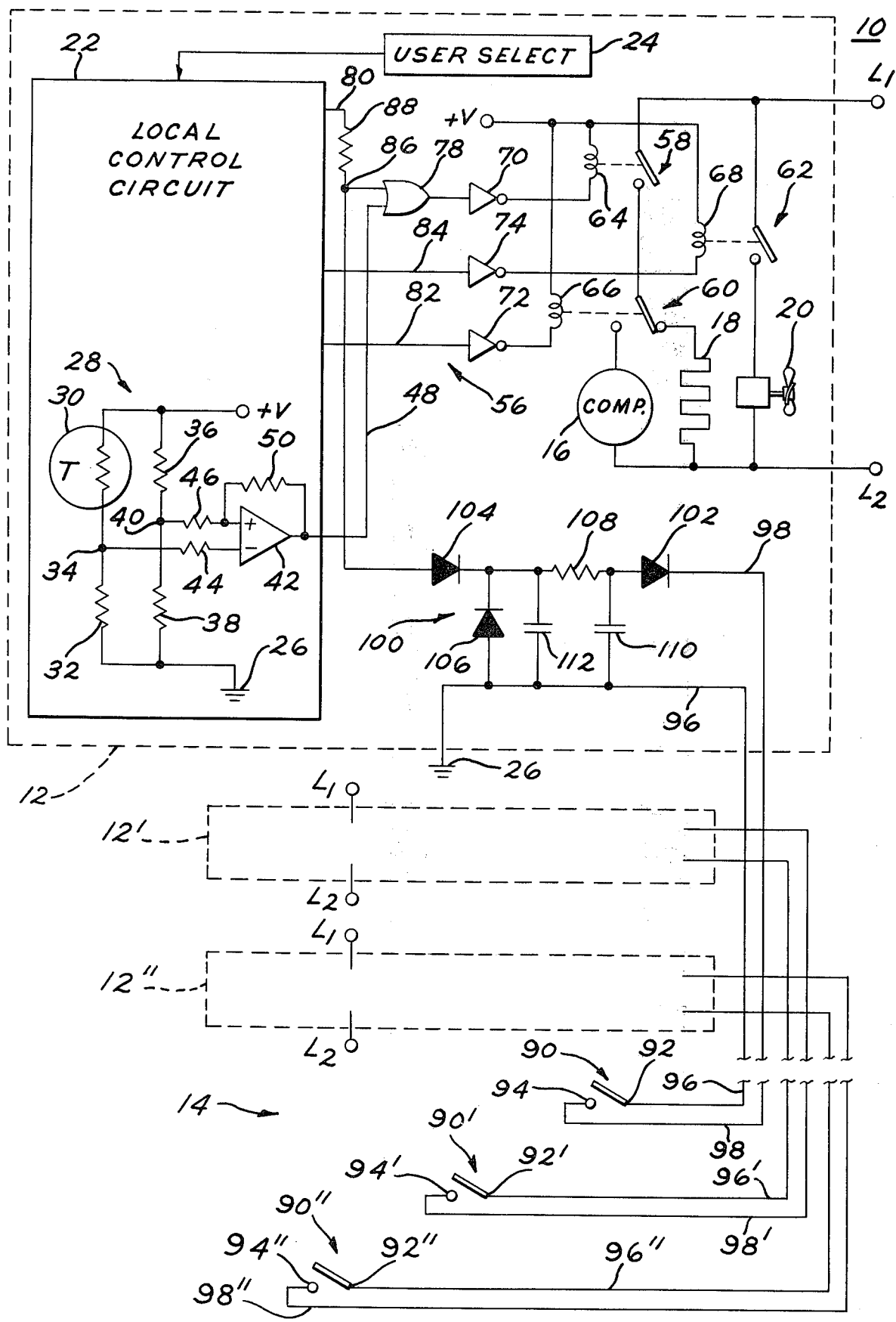

CENTRAL DESK AIR CONDITIONING CONTROL SYSTEM

BACKGROUND OF THE INVENTION

The present invention relates generally to air conditioning systems for multiple room structures having independently actuable heating and cooling units in each room and, more particularly, to such systems including central desk remote control capability.

In installations including a plurality of air conditioning units such as at motels, apartments, and office buildings where individual units are used for the various zones requiring cooling or heating, remote controls have been provided wherein any one or a plurality of the individual room units may be selectively rendered inoperative from a central desk control station. This ability to render zone units inoperative from a remote point is a desirable feature which permits overall economy of operation where not all rooms are occupied or in use at the same time. Unneeded units may simply be turned off. Moreover, such systems facilitate zoned temperature control. That is, the temperature of each room may individually be adjusted as desired by means of a local thermostatic control. There may further be provided user selection between heating operation, cooling operation, or fan-only operation. Examples of such central desk control systems permitting remote on and off control are disclosed in commonly-assigned Jones U.S. Pat. No. 3,871,443 and in Bryans U.S. Pat. No. 4,143,813.

Although the present invention is concerned primarily with central desk control systems providing simple on or off control of the individual room units, it may be noted that in more elaborate central desk systems remote control over heating and cooling mode operation, temperature setting, or various combinations may be provided. For example, central desk systems providing remote control of both mode and temperature are disclosed in Pratt, Jr. U.S. Pat. No. 4,174,064 and in Dawson U.S. Pat. No. 4,284,126. Central systems for remotely controlling temperature are disclosed in Bradford U.S. Pat. No. 4,077,566 and in Cleary et al. U.S. Pat. No. 4,132,355. A central system for remotely controlling mode is disclosed in commonly-assigned Pohl et al. U.S. Pat. No. 4,287,939.

While not a central desk control system, the system of Hoffman et al. U.S. Pat. No. 4,060,123 is somewhat related in that power to a room air conditioning unit may be interrupted by means of a relay in a separate energy-saving module which is controlled by a person entering or leaving the room.

A wide variety of specific types of air conditioning units have been employed in multiple room structures, and there is accordingly no intention to limit the present invention for use in combination with any particular such unit other than as set forth in the appended claims. Similarly, the term "air conditioning" is employed herein in a broad sense to mean any form of unit which alters the characteristics of room air, for example by either heating, cooling, or both, or even through humidity modification. As one example, a typical such room sized unit includes an air cooling subsystem comprising a closed circuit refrigeration system having a refrigerant evaporator in heat exchange relationship with recirculating indoor air flow, and a separate heating subsystem comprising electrical resistance heaters. As another example, the closed circuit refrigeration system may be reversible and comprise what is conventionally termed a "heat pump" to provide heating, as well as cooling, with the electrical resistance heaters being required only for supplemental purposes. Also, a reversible air valve heat pump may be employed, where the evaporator and condenser retain their usual functions relative to the closed circuit refrigeration system, but indoor and outdoor airflows are selectively directed over the evaporator and condenser.

Another feature which may be included in a room-sized air conditioning unit is a "Freeze Sentinel" circuit. A Freeze Sentinel circuit functions to energize a heating load whenever required to ensure that room temperature does not fall below a predetermined temperature, for example 40° F., regardless of user control settings.

In each of the specific types of air conditioning units summarized above, it will be appreciated that there is at least one major energy-consuming load such as a refrigerant compressor motor or an electrical resistance heater. Refrigerant compressor motors are included in closed circuit refrigeration systems which provide room air cooling, and are also included in reversible cycle heat pump systems wherein a closed circuit refrigeration system selectively provides both room cooling and heating. Electrical resistance heaters are typically included as supplemental units and reversible cycle heat pump units for use when the heat pump itself is unable to satisfy the heating load, and are included as the primary heat source in non-reversible systems which selectively provide either cooling by refrigeration or heating by electrical resistance heat.

Individual room air conditioning units also typically include one or more relatively lower-power electrical load devices which do not directly provide heating or cooling energy. A typical example of such a relatively lower-power load is an electric motor driven fan used for air circulation, the term "air circulation" including ventilation through the forced introduction of outdoor ambient air. Another example of a relatively lower-power electrical load is electronic control circuitry for establishing user temperature selection and user control over heating, cooling, and fan-only operation. Especially in the context of electronic control circuitry which typically includes volatile memories for user mode selections and temperature selections, it is desirable to continuously maintain supply voltage.

In the design of such central desk control systems, easy installation and reliability of operation are important considerations. There are a number of aspects to the general problem of providing a system which is easy to install and reliable.

For example, it is increasingly common for solid state electronic controls to be employed in the individual room units, either microprocessor-based controls or controls employing discrete logic devices. It will be appreciated that such control circuitry operates normally with relatively low voltages, and is susceptible to nearly instantaneous damage in the event of any overvoltage, however momentary, or application of voltage or incorrect polarity. Moreover, in the case of control circuits having relatively high impedance levels such as may be associated with operational amplifier circuits or MOS digital logic devices, the circuits are relatively susceptible to extraneous voltage pick-up from either capacitive or inductive coupling. This is particularly so where there are extended conductor runs external to the control circuitry. Even though such induced voltages may not cause actual damage to the control circuitry, the induced voltages may be erroneously interpreted as valid control signals, resulting in faulty operation.

In a typical central desk system installation, a set of control conductors is run from each individual room unit to the central desk location. It is desirable to minimize the amount of specialized circuitry and equipment required at the central desk end of the control conductors.

Moreover, either during initial system installation or during subsequent modifications, incorrect voltages or polarities may be applied to the control conductors extending from individual room units. This is particularly likely to occur at the central desk end of the control conductors. Accordingly, it is also desirable to minimize the possibility of damage to the control circuitry in the individual room unit caused by the application of such incorrect voltage or polarities.

SUMMARY OF THE INVENTION

Accordingly, it is an object of the invention to provide a central desk control system which provides on and off control of a plurality of individual room units.

It is another object of the invention to provide such a system which is relatively easy to install.

It is yet another object of the invention to provide such a system fully compatible with electronic control circuitry operating at relatively low voltage and which minimizes the possibility of damage to the control circuitry or false operation due to induced voltages on the control wiring.

It is still another object of the invention to provide a central desk control system which is inexpensively interfaced with electronic control circuitry in individual room units.

Briefly, and in accordance with an overall concept of the invention, a central desk control system is provided including electronic control circuitry within each individual room unit. A single pair of control conductors extends from each room unit to the central desk location. At the central desk end of the control conductors, the only equipment required is a single SPST switch corresponding to each individual room unit. Even though voltages are normally never applied to the control conductors at the central desk end, in accordance with the invention it is recognized that inadvertant application of such voltage may occur, and protection in the event of such occurence is provided.

In accordance with another overall concept of the invention, it is recognized it is advantageous if there is no visual change at the individual room unit when the central desk control is activated. This is particularly so where the local control circuitry at each individual room unit is electronic. The individual room unit should simply resume the user-selected operation whenever the central desk allows the room unit to be "on." Similarly, in accordance with the invention it is recognized that, for energy-conservation purposes, it is necessary to remotely turn off only the major energy-consuming loads such as compressors and heaters, and that it is unnecessary to turn off loads such as fans. Indeed, it is desirable to leave fans on in order to at least get the benefit of air circulation and ventilation, and to minimize the apparent change in operation at the individual room unit when the central desk control is activated. Accordingly, the system of the invention operates to cut off power only to the major energy-consuming loads when the central desk control is activated, leaving user mode control circuitry and relatively low-power loads such as fans unaffected.

Briefly stated, and in accordance with a more particular aspect of the invention, there is provided an air conditioning system including a plurality of air conditioning units and a central control system. Included in each of the air conditioning units is at least one major energy-consuming load, typically a refrigerant compressor, an electrical resistance heater, or both. Connected to each of the air conditioning units is relatively local control circuitry for directing the respective major energy-consuming load cycle on and off as required to maintain a desired temperature in the space conditioned by the respective units. Circuitry is included within each of the air conditioning units defining a reference potential, with a terminal at the reference potential. A controlled power switching circuit, such as a power relay and a solid state relay driver, is included within each of the air conditioning units for the respective major energy-consuming load. Each of the controlled power switching units has both a normal mode in which the major energy-consuming load operates in response to the local control circuitry to maintain the desired temperature, and a low-energy mode in which operation of the major energy-consuming load is disabled. Each of the controlled power switching circuits further has a control input effective when connected to the reference potential to select one of the modes and effective when not connected to reference potential to select the other of the modes. Preferably, the one mode selected when the control input is connected to the reference potential is the low-energy load.

For each of the air conditioning units is a relatively remote control switch. Preferably, the relatively remote control switches are all located at a central location. Each of the relatively remote control switches has two terminals connected via conductors respectively to the reference terminal and to the control input in the corresponding air conditioning unit such that one mode is selected when the remote control switch is closed, without affecting the relatively local control circuitry. Finally, a protective network is included in each of the air conditioning units interposed between the conductors and the reference terminal and control input. The protective network at least includes elements arranged to prevent damage to the local control circuitry, the reference circuitry and the power switching element in the event voltage of either polarity is inadvertantly applied to the conductors. Additionally, particularly where the relatively local control circuitry, the reference circuitry and the controlled power switching circuitry comprise relatively low voltage electronic circuits, the protective network further preferably includes elements comprising a low-pass filter for minimizing the possibility of induced voltage on the conductors interfering with operation of the relatively low voltage electronic circuits.

In a typical system, the user selection circuitry permits user selection between heating and cooling operation. With the system of the present invention, user selection, and any control indications visible to the user, remain unaffected by operation of the remote control switch. For example, in the event Light Emitting Diodes (LED's) are employed to indicate user mode selection, the LED corresponding to the user-selected mode remains ON.

In accordance with another aspect of the invention, the freeze sentinel circuit continues to operate even while the low-energy mode is selected by the central desk control. Thus the important function of the freeze sentinel is not disabled.

BRIEF DESCRIPTION OF THE DRAWING

While the novel features of the invention are set forth with particularity in the appended claims, the invention, both as to organization and content, will be better understood and appreciated, along with other objects and features thereof, from the following detailed description taken in conjunction with the drawing, in which:

The single drawing FIGURE is an electrical schematic diagram of an air conditioning control system in accordance with the invention.

DETAILED DESCRIPTION OF THE PREFERRED EMBODIMENT

Referring now to the drawing, an air conditioning system, generally designated 10, includes a plurality of individual room air conditioning units of which units 12, 12' and 12" are representative. The system 10 also includes a central control system having a number of distributed elements within the air conditioning units 12, 12' and 12" and including a central control location generally designated 14. In the drawing FIGURE, circuit details of representative air conditioning unit 12 only are depicted, and the corresponding details of the other two representative air conditioning units 12' and 12" are, for convenience of illustration, omitted. It will be appreciated however that they are essentially identical. It will further be appreciated that the overall air conditioning system 10 may include any number of individual air conditioning units such as units 12, 12' and 12" depicted.

The air conditioning units 12, 12' and 12" may be any type of unit for space heating, cooling or both and including at least one major energy-consuming load. Illustratively, the air conditioning unit 12 is of the reversible heat pump type including a reversible refrigeration system including a single refrigerant compressor 16 serving both the cooling and heating functions, and an auxiliary electrical resistance heater 18 which operates when the heat pump system is unable to supply the heating load. The major energy-consuming loads comprising the compressor 16 and electrical resistance heater 18 are supplied from a source of AC power comprising lines $L_1$ and $L_2$ connected to the air conditioning unit 12.

Also included in the air conditioning unit 12 is a motor-driven fan 20 which, although supplied from the conductors $L_1$ and $L_2$, consumes relatively little power in comparison with the compressor 16 and electrical resistance heater 18. The fan 20, depending upon the operational mode selected, circulates air over a cooling evaporator (not shown) or a heating condenser (not shown) in a refrigerant circuit with the compressor 16, or over the electrical resistance heater 18. Typically, the fan 20 may also be operated in a fan-only mode merely for air recirculation purposes, which includes drawing in fresh outdoor ambient air.

It will be appreciated that a variety of specific arrangements for such air conditioning units are possible, differing in mechanical arrangement, specific mode of operation, and electrical connections. It will further be appreciated that the air conditioning unit 12 is shown in highly-schematic fashion, and a number of elements necessary for a complete air conditioning unit are omitted as will be well understood by those skilled in the art. The present invention, however, is neither concerned with nor limited to any particular such combination of elements or arrangement.

Also included in the representative air conditioning unit 12 is a relatively local control circuit 22. The relatively local control circuit 22 serves to appropriately direct the operation of the compressor 16 and the electrical resistance heater 18, specifically, to cycle the compressor 16 and electrical resistance heater 18 on and off as required to maintain a desired temperature in the space conditioned by the unit 12. The relatively local control circuit is directed by user selection circuitry 24 including, for example, a mode selection switch and a thermostat adjustment (neither specifically shown). It will similarly be appreciated that a wide variety of local control circuits are possible.

In the preferred embodiments of the invention, the relatively local control circuit 22 comprises electronic control circuitry operating at relatively low voltages, typically in the order of 5 to 12 volts DC. The local control circuit 22 includes a conventional low voltage power supply (not shown) operating from the AC supply lines $L_1$ and $L_2$ and providing an output voltage between $+V$ terminals and circuit ground 26.

While circuitry of the relatively local control circuit 22 is generally not described in detail herein, one particular aspect of the local control circuit 22 deserving mention in the context of the present invention is the inclusion of "Freeze Sentinel" circuitry 28. The function of the freeze sentinel circuitry 28 is to energize a heating load when required to ensure that the temperature of the room in which the unit 10 is located does not fall below a predetermined temperature, for example 40° F., regardless of the user control settings, and even though the unit 12 may be turned "OFF" insofar as the user is concerned.

In view of the important function of the freeze sentinel circuit 28, in accordance with the present invention the operation of the freeze sentinel circuit 28 is not inhibited even while the subject central desk control system comprising the central control location 14 and hereinafter described in detail is directing the air conditioning unit 12 to be OFF. In other words, the freeze sentinel circuit 28 continues to operate normally even while the low energy mode is selected.

The exemplary freeze sentinel circuit 28 is in essence a thermostatic control with a fixed temperature setting. The freeze sentinel circuit 28 includes a temperature voltage divider comprising a negative temperature coefficient thermistor 30 and a fixed resistor 32 connected in series between $+V$ and circuit ground 26 to provide a temperature-dependent voltage at a node 34, and a reference voltage divider comprising fixed resistors 36 and 38 connected in series between $+V$ and circuit ground 26 to provide a fixed reference voltage at a node 40. The thermistor 30 is physically located so as to respond to room temperature and preferably is the same thermistor employed in the user-adjustable thermostatic control circuitry (not shown) for normal room temperature control.

The nodes 34 and 40 are connected to a comparator 42 through respective input resistors 44 and 46. The node 34 supplying the temperature-dependent voltage is connected to the comparator 42 inverting ($-$) input and the node 40 supplying the fixed reference voltage is connected to the comparator 42 non-inverting ($+$) input such that, as sensed temperature decreases and the resistance of the thermistor 30 increases, the voltage applied to the inverting (−) input decreases until it is less than the fixed reference voltage applied to the non-inverting (+) input, whereupon the comparator 42 output line 48 goes high. To provide a slight degree of hyteresis, a positive feedback resistor 50 is connected between the comparator 42 output and the non-inverting (+) input.

By way of example, the input resistors 44 and 46 each have a resistance of 150K Ohm, and the positive feedback resistor 50 has a resistance of 10.0 Megohm. The resistors 34, 36 and 38 are all selected in view of the characteristics of the particular thermistor 30 employed to provide a comparator switching threshold corresponding to a sensed temperature of 40° F. The comparator 42 may be included within a National Type No. LM3302 quad comparator integrated circuit package. Inasmuch as the LM3302 comparator has an open-collector output, an output pull-up resistor is required (not shown) which has an exemplary resistance of 6.8K ohm.

As an extension of the local control circuit 22, interposed between the control circuit 22 and the major energy-consuming loads 16 and 18 is a controlled power switching circuit, generally designated 56. The controlled power switching circuit 56 comprises a combination of power relays 58, 60 and 62 having coils 64, 66 and 68 operated by respective solid state relay drivers 70, 72 and 74. In a typical circuit, the relay drivers 70, 72 and 74 comprise digital logic open-collector inverters included within a single integrated circuit package, such as a Type No. ULN2001A Darlington Transistor Array. The relay coils 64, 66 and 68 are all supplied from the low voltage DC source +V included within the local control circuit 22. The DC voltage source +V is referenced to a circuit reference point (ground) 26 established by circuitry within the air conditioning unit 12 and, preferably, within the local control circuit 22.

In the specific relay connections depicted by way of example, the contacts of the relay 60 select between operation of the compressor 16 and the electrical resistance heater 18. The contacts of the relay 58 are arranged, when closed, to supply power to whichever one of the compressor 16 or electrical resistance heater 18 are selected. The relay 58 serves as the main power relay for the compressor 16 and heater 18.

The contacts of the relay 62 are connected when closed to energize the fan 20. The fan 20 can be energized through the contacts of the relay 62 even though the contacts of the main power relay 58 are open.

The input of the driver 70 for the main power relay 58 is supplied through a digital logic OR gate 78, which may comprise a standard CMOS logic gate. In order to operate the power relay 58 and thus the heater 18 whenever the local control circuit 22 calls for normal heat or whenever the freeze sentinel circuit 28 calls for heat, the inputs of the OR gate 78 are connected respectively to a representative output line 80 of the local control circuit and to the freeze sentinel 28 output line 48. The local control circuit 22 has two additional representative output lines 82 and 84 connected respectively to operate the relays 60 and 62 through the relay drivers 72 and 74.

In the operation of the circuitry of the air conditioning unit 12 as thus far described, the local control unit 22 provides logic high outputs on the lines 80, 82 and 84 as is appropriate to effect the desired operation of the compressor 16, electrical resistance heater 18 and the fan 20. In addition, a logic high output on the freeze sentinel output line 48 operates the compressor 16 or electric heater 18, depending on the state of the output line 82 and relay 60. Although not shown, it will be appreciated that various other logical connections may be made to the freeze sentinel circuitry 28 to appropriately control the output lines 82 and 84, particularly the line 84 controlling operation of the fan 20. It will be further be appreciated that a wide variety of such circuits are possible, and a present invention is not limited to any such circuit.

The controlled power switching circuit 56, and more particularly the portion thereof for operating the main power relay 58 and thus the compressor 16 and electrical resistance heater 18, has both a normal mode in which the compressor 16 and electrical resistance heater 18 operate in response to the local control circuit 22 to maintain the desired temperature, and a low energy mode in which operation of the compressor 16 and electrical resistance heater 18 is disabled. The controlled power switching circuit 56 has a control input 86 effective when connected to the reference potential at 26, to select one of the modes and effective, when not connected to the reference potential at 26 to select the other of the modes. In the particular circuit illustrated, the one mode which is selected when the control input 86 is connected to the circuit reference point 26 is the low-energy mode. Advantageously, in the particular circuit illustrated, the circuit reference point used for this purpose is for convenience in essence the circuit ground, although it will be appreciated that other reference points may equally well be employed depending upon the particular circuit.

For convenience, the illustrated circuit is a relatively simple signal-shunting circuit facilitated by the relatively high output impedance of the local control circuit 22 as represented by the series resistance 88 in the control circuit 22 output line 80. Thus, when the control input 86 is shunted to the circuit reference point 26, the upper input of the OR gate 78 is held at logic low regardless of the actual output of the local control circuit 22 on the line 80. The presence of the series resistance 88 serves to prevent damage to output devices (not shown) within the local control circuit 22.

At the central location 14 is a relatively remote control switch 90 for the air conditioning unit 12, the switch 90 being of the SPST type and having two terminals 92 and 94 connected via conductors 96 and 98 respectively to the reference terminal 26 and to the control input 86. Thus, when the remote control switch 90 is closed, the low-energy is selected without affecting the local control circuit 22. Upon re-opening of the remote control switch 90, the local control circuit 22 immediately resumes full control of the air conditioning unit 12. Corresponding switches 94' and 94" and conductors 96', 96", 98' and 98" are for controlling the other two representative units 12' and 12".

Significantly, the switch 90 at the central location 14 affects only the output lines 80 from the local control circuit 22, and does not affect the output line 48 from the freeze sentinel circuit 28, which is connected to an entirely separate input of the OR gate 78. Thus, the freeze sentinel circuit 28 can operate the heating loads when the room temperature is below 40° F. even while the switch 90 is closed.

Also included in the air conditioning unit 12 is a protective network 100 interposed between the conductors 96 and 98 and the reference terminal 28 and the control input 86. The protective network 100 includes elements arranged to prevent damage to the local control circuit 22, the reference circuitry included therein, and to the power switching circuit 56 in the event voltage of either polarity is inadvertantly applied to the conductors 96 and 98.

More particularly, the protective network 100 includes a pair of series diodes 102 and 104 and a shunt diode 106. The particular diode polarities illustrated are for the situation where the local control circuit 22 outputs positive control voltages relative to the circuit reference point 26. Thus, the diodes 102, 104 and 106 do not interfere with normal operation of the relatively remote control switch 90. In particular, the diode 106 is always reverse-biased for normal operating voltages, and is thus effectively out of the circuit. The diodes 102 and 104 are polarized so as to enable the shunting of the positive voltage at the control input 86 to the circuit reference point 26.

In the event a positive voltage is inadvertently applied to the conductor 98 with reference to the conductor 96, the diode 102 blocks the voltage, thus preventing any effect on the remaining circuitry, or damage thereto.

If on the other hand a negative voltage is inadvertantly applied to the conductor 98 relative to the conductor 96, the diode 102 conducts. However, the shunt diode 106 also conducts, bypassing the inadvertantly-applied voltage, and preventing damage to the remainder of the circuit. Aiding in the operation of the shunting diode 106 in a series connected resistor 108 which, depending upon the magnitude of the negative voltage applied, will either withstand the voltage drop or act as a fuse and be destroyed. In either event the remainder of the circuitry is saved from damage.

In a typical circuit, the protective diodes are each a type No. 1N4004 silicon rectifier diode rated at 400 peak inverse volts. Thus, the protective network 100 easily protects the remainder of the circuitry from standard 120 volt or even 240 volt AC line voltage which might inadvertantly be connected to the conductors 96 and 98.

Preferably, the protective network 100 also includes elements comprising a low-pass filter for minimizing the possibility of induced voltage on the conductors 96 and 98 interfering with the operation of the circuitry within the air conditioning unit 12. As will be appreciated by those skilled in the art, such conductors 96 and 98 may have relatively long runs, and may run parallel to a variety of other conductors, including conductors carrying power line voltages and carrying voltage transients. Thus, although not directly connected, the conductors 96 and 98 are apt to have extraneous voltages induced in them.

The low-pass filter depicted is a pi-section filter comprising the series resistor 108, and input and output shunt capacitors 110 and 112. As typical component values, the resistor 108 may be a 220 Ohm, ¼ watt resistor, and the capacitors 110 and 112 may have a capacitance of 0.2 mfd.

It will be apparent, therefore, that the present invention provides an improved air conditioning system of the central desk type which is relatively simple to install, and unlikely to be damaged, and having advantageous operational features.

While specific embodiments of the invention have been illustrated and described herein, it is realized that numerous modifications and changes will occur to those skilled in the art. It is therefore to be understood that the appended claims are intended to cover all such modifications and changes as fall within the true spirit and scope of the invention.

What is claimed is:

1. An air conditioning system including a plurality of air conditioning units and a central control system, said air conditioning system comprising:

at least one major energy-consuming load included in each of said air conditioning units;

relatively local control circuitry respectively connected to each of said air conditioning units for directing the respective major energy-consuming load to cycle on and off as required to maintain a desired temperature in a space conditioned by the respective units;

circuitry included within each of said air conditioning units defining a reference potential, and a terminal at the reference terminal;

a controlled power switching circuit for the respective major energy-consuming load included within each of said air conditioning units, each of said controlled power switching circuits having both a normal mode in which said major energy-consuming load operates in response to said local control circuitry to maintain the desired temperature and a low-energy mode in which operation of said major energy-consuming load is disabled, and each of said controlled power switching circuits having a control input effective when connected to the reference potential to select one of said modes and effective when not connected to the reference potential to select the other of said modes;

a relatively remote control switch for each of said air conditioning units, each of said relatively remote control switches having two terminals connected via conductors respectively to said reference terminal and to said control input in the corresponding air conditioning unit such that said one of said modes is selected when said remote control switch is closed without affecting said relatively local control circuitry; and a protective network included in each of said air conditioning units interposed between said conductors and said reference terminal and said control input, said protective network including elements arranged to prevent damage to said local control circuitry, said reference circuitry, or to said power switching circuit in the event voltage of either polarity is inadvertently applied to said conductors.

2. An air conditioning system in accordance with claim 1, wherein said relatively remote control switches are all located at a central location.

3. An air conditioning system in accordance with claim 1, wherein said one of said modes selected when said remote control switch is closed is said low-energy mode.

4. An air conditioning system in accordance with claim 1, wherein said major energy-consuming load is a refrigerant compressor.

5. An air conditioning system in accordance with claim 1, wherein said major energy-consuming load is an electrical resistance heater.

6. An air conditioning system is accordance with claim 1, wherein each of said air conditioning units includes both a refrigerant compressor and an electrical resistance heater as major energy-consuming loads.

7. An air conditioning system in accordance with claim 1, wherein said relatively local control circuitry includes user selection circuitry unaffected by said relatively remote control switch.

8. An air conditioning system in accordance with claim 7, wherein said user selective circuitry allows selection between heating and cooling operation.

9. An air conditioning system in accordance with claim 1, wherein each of said air conditioning units includes an air-circulating fan the operation of which is unaffected by said relatively remote control switch.

10. An air conditioning system in accordance with claim 1, wherein said relatively local control circuitry, said reference circuitry, and said controlled power switching circuitry comprise relatively low voltage electronic circuit.

11. An air conditioning system control system in accordance with claim 10, wherein each of said protective network includes elements comprising a low-pass filter for minimizing the possibility of induced voltage on said conductor interfering with operation of said relatively low-voltage electronic circuits.

12. An air conditioning system in accordance with claim 1, wherein
said relatively local control circuitry includes a freeze sentinel circuit for operating a heating load in the respective air conditioning unit whenever room temperature falls below a pedetermined temperature; and wherein
said freeze sentinel circuit continues to operate normally even while the low energy mode is selected.

* * * * *